United States Patent [19]

Matsui et al.

[11] Patent Number: 5,249,032
[45] Date of Patent: Sep. 28, 1993

[54] OPTICAL POSITION-DETECTING APPARATUS

[75] Inventors: Keiji Matsui; Shuzo Hattori, both of Niwa, Japan

[73] Assignee: Okuma Corporation, Aichi, Japan

[21] Appl. No.: 788,296

[22] Filed: Nov. 5, 1991

[30] Foreign Application Priority Data

Nov. 20, 1990 [JP] Japan .................. 2-315107

[51] Int. Cl.⁵ .............................................. G01B 9/02
[52] U.S. Cl. ....................... 356/356; 356/358; 356/360; 356/363; 250/561
[58] Field of Search .............. 356/356, 360, 363, 358; 250/561

[56] References Cited

U.S. PATENT DOCUMENTS 4,984,890 1/1991 Tojo et al. ......................... 356/363
5,011,287 4/1991 Mino .................................. 356/356

Primary Examiner—Samuel A. Turner
Assistant Examiner—LaCharles Keese
Attorney, Agent, or Firm—Wenderoth, Lind & Ponack

[57] ABSTRACT

An optical position-detecting apparatus includes an optical block capable of causing interference light having interference fringes perpendicular to a diffraction grating on a subject of measurement to be all the time projected onto the diffraction grating. The apparatus detects the position of a subject of measurement by receiving either light transmitted through a diffraction grating on said subject of measurement or light reflected from said diffraction grating. The apparatus includes an optical block for causing collimated rays generated from a coherent light source to be diffracted, for causing only the "±1" order diffracted light to be extracted and to interfere with each other, and for causing an interference light field area having interference fringes perpendicular to said diffraction grating to be generated and to be projected onto said diffraction grating. Thus, it is possible, with a simple construction, to assure stable outputting of a displacement signal.

7 Claims, 6 Drawing Sheets

OPTICAL POSITION-DETECTING APPARATUS

BACKGROUND OF THE INVENTION

1. Field of the Invention

The present invention relates to an optical position-detecting apparatus which is used in a machine tool or the like to measure a position.

2. Description of the Related Art

FIG. 1 schematically shows the construction of an example of a conventional optical position-detecting apparatus. The position-detecting apparatus has a detecting section 5 capable of being displaced relative to a main scale 2 mounted on a subject being measured (hereinafter referred to as "the subject of measurement"). The main scale 2 is formed with a transmission-type diffraction grating which extends throughout the measurement length of the main scale 2 (the measurement length lies in the longitudinal direction of the main scale 2). The diffraction grating is composed of a plurality of transmitting portions and a plurality of non-transmitting portions, which are repeatedly provided along the main scale 2. The detecting section 5 comprises a light source 1 for radiating a collimated rays onto the main scale 2, an index scale 3 formed with a transmission-type diffraction grating having the same pitch as the transmission-type diffraction grating of the main scale 2, and a photodetector 4 for performing the photo-electric conversion of light transmitted through the index scale 3 and for outputting a displacement signal.

The position-detecting apparatus having the above-described construction operates in the following manner. Collimated rays generated from the light source 1 are transmitted through the respective transmitting portions of the main scale 2 and the index scale 3. Then, the transmitted light rays become incident on the photodetector 4, and are subjected to photo-electric conversion. When the main scale 2 and the detecting section 5 have been displaced relative to each other in the longitudinal direction of the main scale 2, the relationship with which the transmitting and non-transmitting portions of the main scale 2 and those of the index scale 2 oppose each other changes periodically, thereby causing a periodical change in the quantity of light made incident of the photo-detector 4. In this way, a periodical displacement signal is obtained.

With the above-described conventional optical position-detecting apparatus, since the distance between the main scale 2 and the index scale 3 greatly influences the amplitude and the waveform of a displacement signal, it is necessary to provide a mechanism for always keeping constant the distance between the main scale and the index scale.

SUMMARY OF THE INVENTION

The present invention has been made in view of the above-described circumstances. An object of the present invention is to provide an optical position-detecting apparatus that is, though having a simple construction, always capable of outputting a displacement signal in a stable manner.

According to the present invention, by virtue of the provision of the optical block capable of causing an interference light field area having interference fringes perpendicular to the diffraction grating on the subject of measurement to be all the time projected onto the diffraction grating, it is possible, with a simple construction, to assure that a displacement signal is always outputted in a stable manner.

The nature, principle and utility of the invention will become more apparent from the following detailed description when read in conjunction with the accompanying drawings.

DESCRIPTION OF THE PREFERRED EMBODIMENTS

Figure 1:
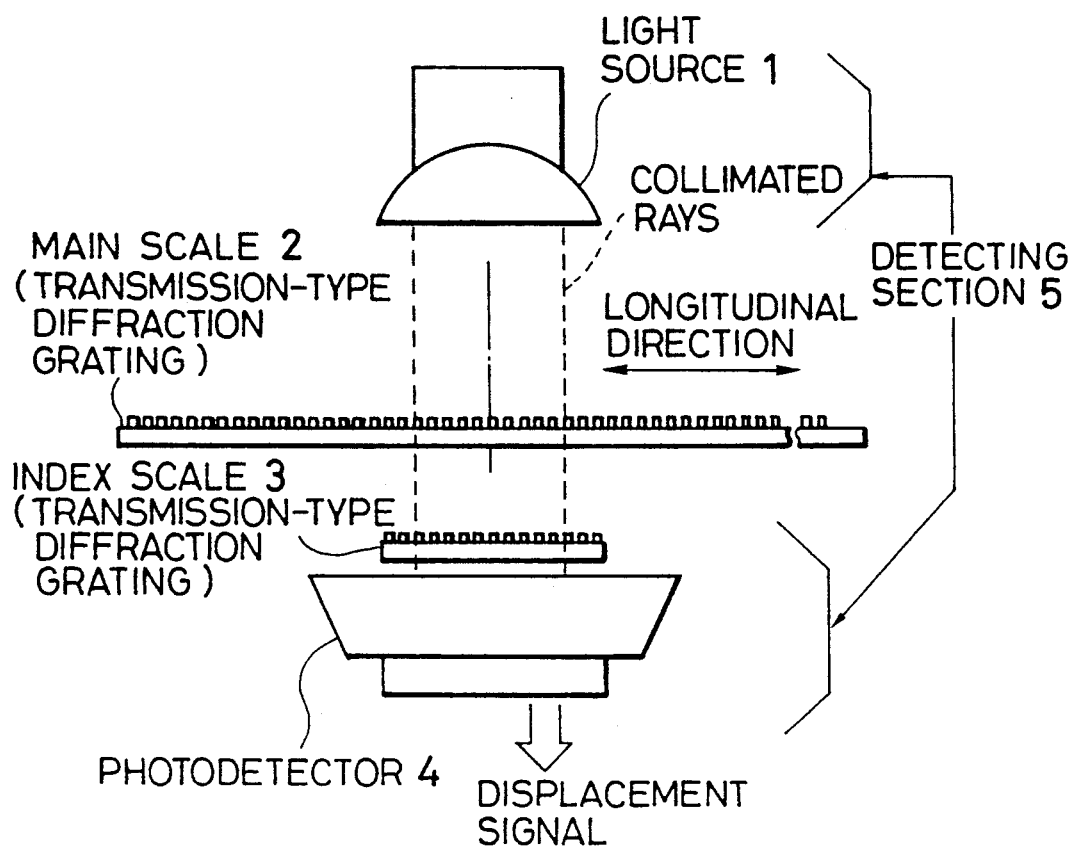
FIG. 1 is an illustration of a conventional optical position-detecting apparatus.
Figure 2:
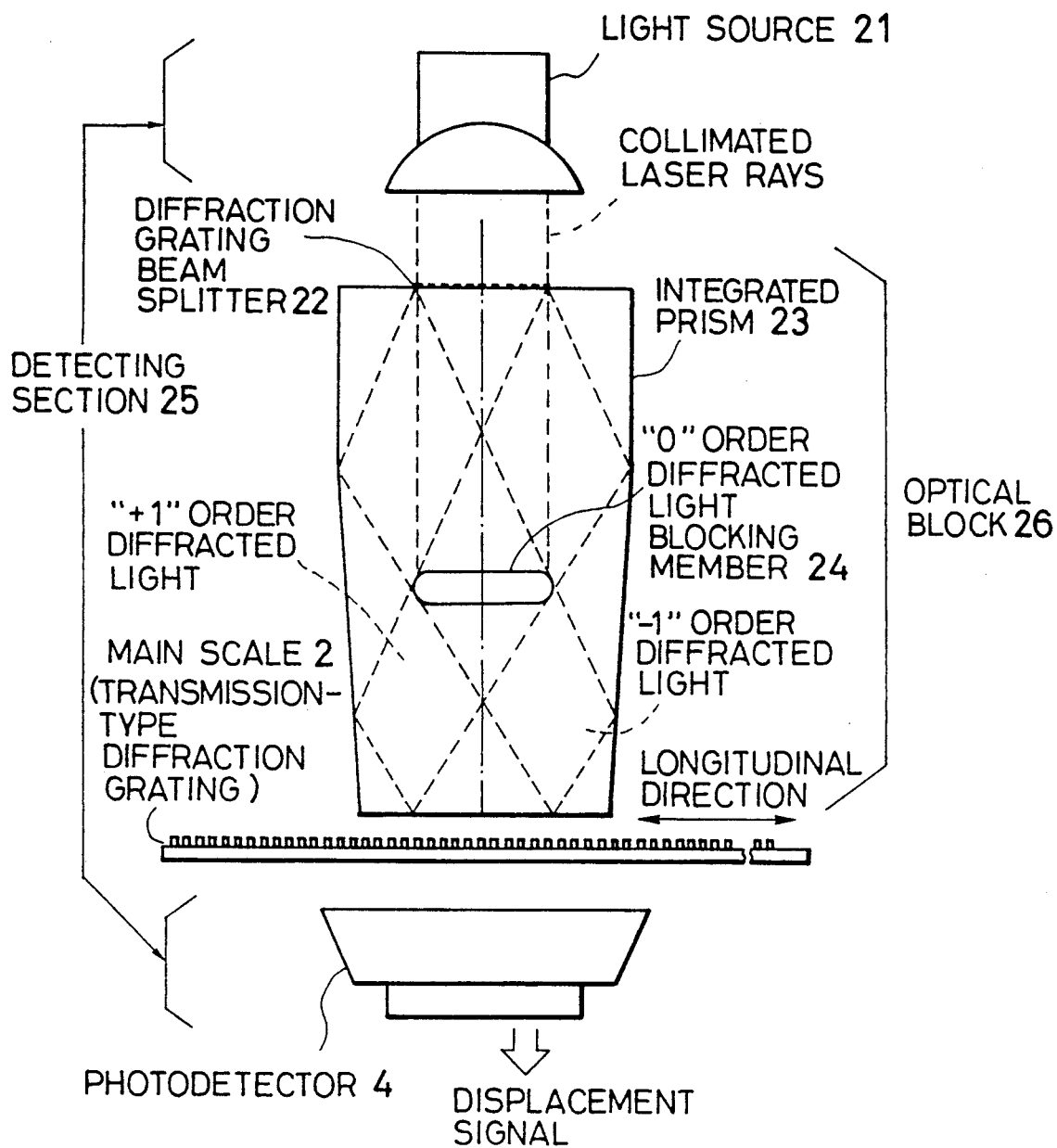
FIGS. 2, 4, 5 and 6 are illustrations of different examples of optical position-detecting apparatuses according to the present invention, respectively.

FIG. 2 illustrates an example of an optical position-detecting apparatus according to the present invention, the drawing schematically showing the construction of the apparatus in correspondence with the construction shown in FIG. 1. The optical position-detecting apparatus has a detecting section 25 and an optical block 26, both capable of being displaced relative to a main scale 2 mounted on a subject of measurement. The detecting section 25 comprises a light source 21 for radiating a collimated rays which are coherent light rays onto the optical block 26, and a photodetector 4 for performing the photo-electric conversion of light transmitted through the optical block 26 and the main scale 2, and for outputting a displacement signal. The optical block 26 comprises a diffraction grating beam splitter 22 formed on an integrated prism 23 in order to diffract collimated laser rays generated from the light source 21, the integrated prism 23 for causing, among the rays diffracted by the diffraction grating beam splitter 22, those diffracted rays having "2" or more orders of diffraction to be emitted to the outside of the system of the optical block 26, and a "0" order diffracted light blocking member 24 for causing, among the diffracted rays passing through the integral prism 23, only those diffracted rays having the "0" order of diffraction to be blocked.

The position-detecting apparatus having the above-described construction operates in the following manner. Collimated laser rays generated from the light source 21 is radiated onto the diffraction grating beam splitter 22, whereupon the parallel rays are diffracted. Among the diffracted rays, the "0" order diffracted rays travel in straight lines until their passage is prevented by the "0" order diffracted light blocking member 24. Those diffracted rays having "1" or more orders of diffraction travel to the side surfaces of the integrated prism 23. Among these rays, diffracted rays having "2" or more orders of diffraction are, due to their great angles of diffraction, emitted from the side surfaces of the integrated prism 23 to the outside of the measurement system. Diffracted rays having the "±1" orders of diffraction are reflected from the side surfaces of the integrated prism 23 to cause interference, as shown in FIG. 3.

Figure 3:
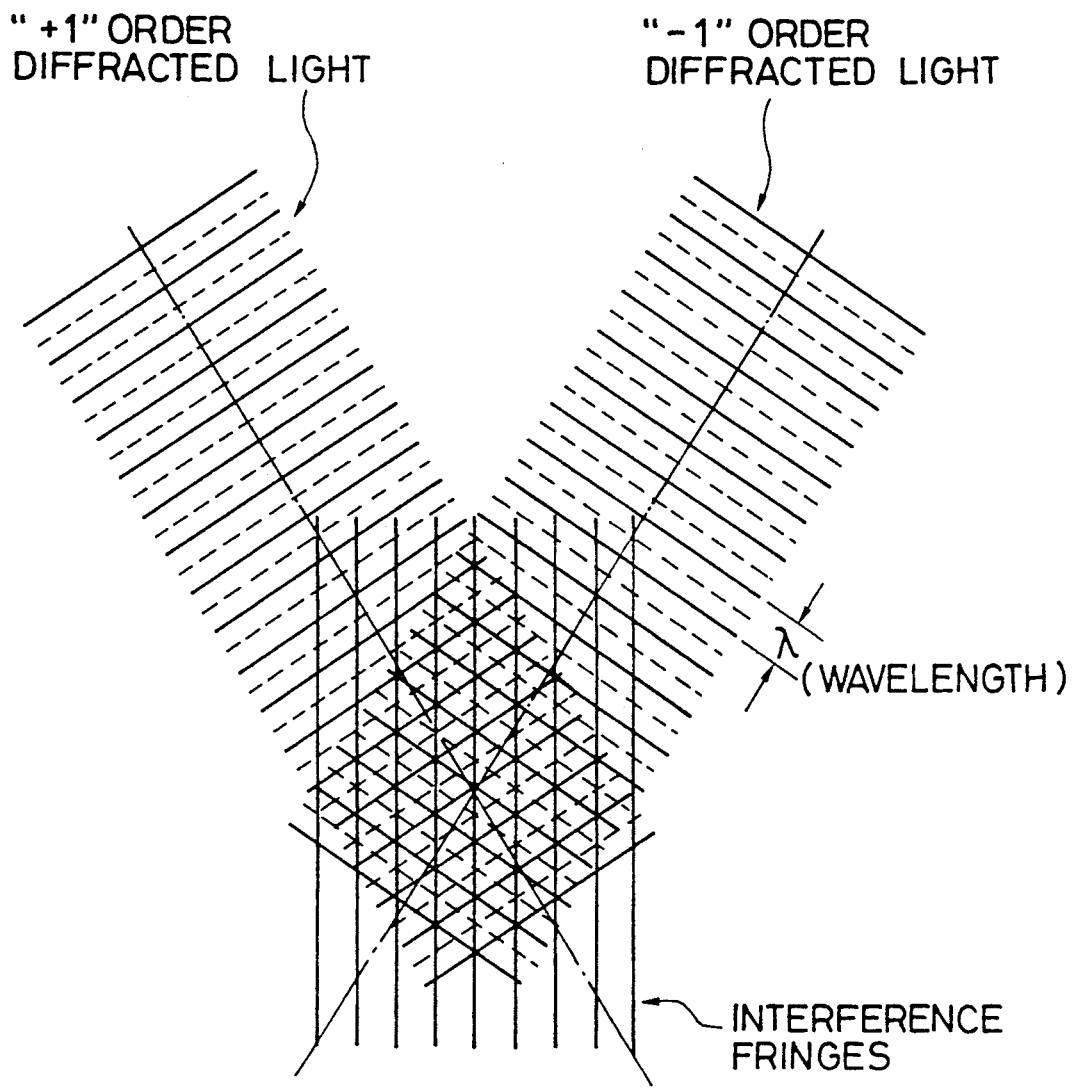
FIG. 3 is an illustration showing the principles of the present invention.

In FIG. 3, the solid lines and the broken lines representing the "±1" order diffracted rays are on the wave surfaces. The interval between two adjacent solid lines or broken lines corresponds to the wavelength λ of the light, and the interval between a solid line and an adjacent broken line corresponds to λ/2. When the "±1"

order diffracted rays are superimposed on each other, at a point where the difference in optical path is equal to an integer times the wavelength $\lambda$, the intensity of light is increased to produce a bright band, whereas at a point where the difference is equal to $n\lambda \pm \lambda/2$ (n: integer number), the intensity of light is decreased to produce a dark band. As a result, a distribution of bright and dark bands, that is, interference fringes, are generated, the bands or fringes being perpendicular to a transmission-type diffraction grating of the main scale 2 containing transmitting and non-transmitting portions arranged side by side at a certain pitch. The pitch of the fringes is determined by the wavelength $\lambda$ and the angle at which the light having the "+1" order of diffraction intersects the light having the "−1" order of diffraction. If the main scale 2 formed with a transmission-type diffraction grating having the same pitch as such interference fringes is disposed at the position at which the interference fringes are generated, the quantity of light made incident on the photodetector 4 is the maximum when the bright bands oppose transmitting portions of the transmission-type diffraction grating, whereas the quantity of light made incident on the photodetector 4 is the minimum when the bright bands oppose non-transmitting portions of the diffraction grating.

Accordingly, when the detecting section 25 and the optical block 26 have been displaced relative to the main scale 2 in the longitudinal direction of the main scale 2, the relationship with which the bright and dark bands oppose the transmitting portions and the non-transmitting portions of the transmission-type diffraction grating changes periodically. Consequently, the quantity of light made incident on the photodetector 4 changes periodically so that a periodical displacement signal is obtained.

Figure 4:
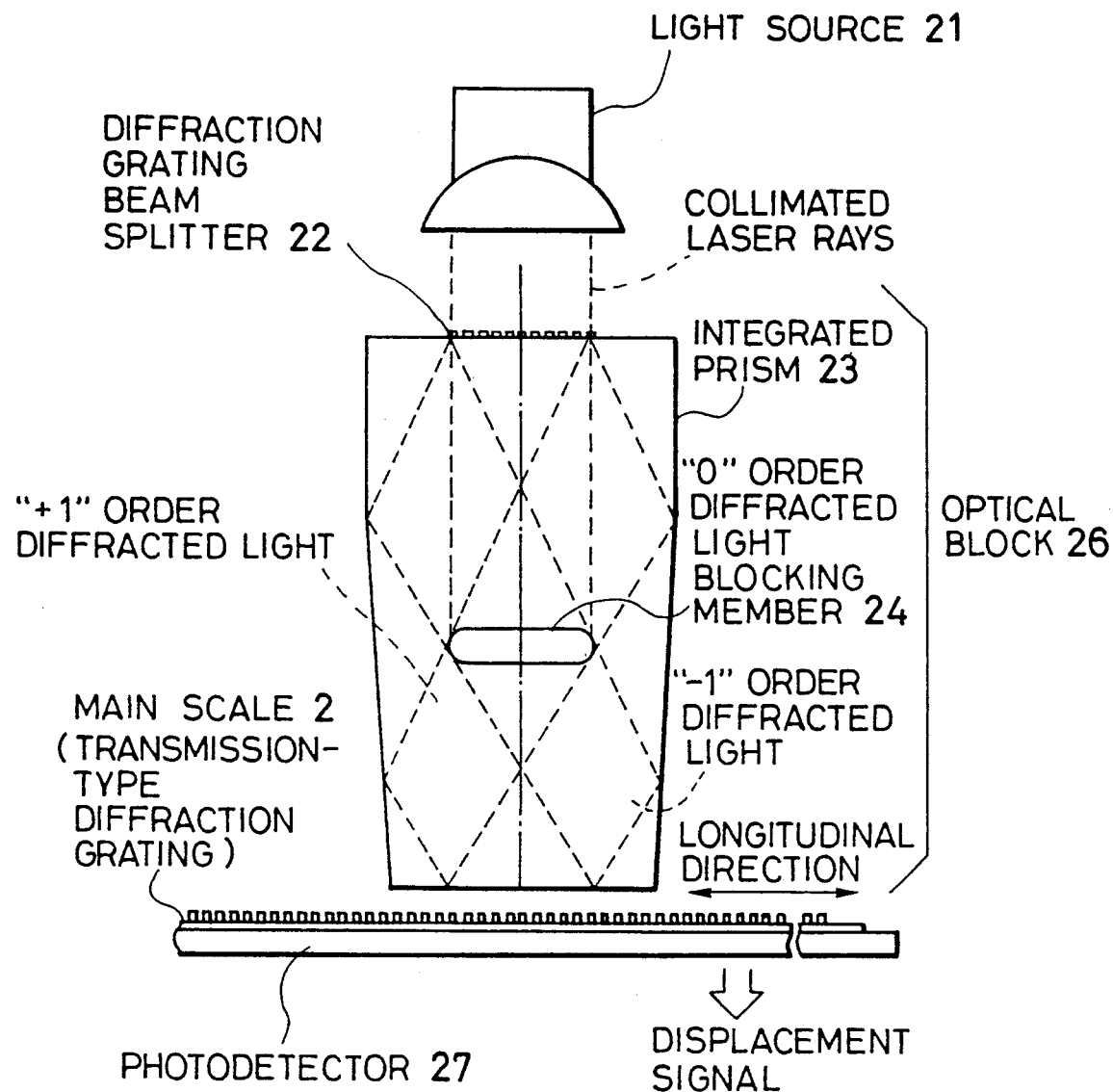

FIG. 4 illustrates another example of an optical position-detecting apparatus according to the present invention, the drawing schematically showing the construction of the apparatus in correspondence with the construction shown in FIG. 2. Components which are the same as those in FIG. 2 are denoted by identical reference numerals, and a description of these components will be omitted.

The optical position-detecting apparatus includes a main scale 2 and a photodetector 27 which together form an integral structure. Light transmitted through a transmission-type diffraction grating of the main scale 2 becomes incident on the photodetector 27 immediately behind the grating, and is subjected to photo-electric conversion. Since there is no need to separately arrange the photodetector 27 in the apparatus, the construction of the optical position-detecting apparatus in simple. In addition, a line through which a displacement signal (which is a relatively weak signal) outputted from the photodetector 27 is carried can be wired on the stationary side of the machine. This wiring is advantageous in that it requires a smaller amount of electric wire than the wiring of electric wires on the movable side, in which case an extra amount of wire must be used to over the distance of movement. Thus, it is possible to improve the electrical and mechanical reliabilities. If the transmission-type grating is formed on a light receiving surface of the photodetector 27, the photodetector 27 is constructed to additionally offer the function of the transmission-type diffraction grating of the main scale 2. In this way, the optical position-detecting apparatus can be compact and can be made by a small number of production processes.

Figure 5:
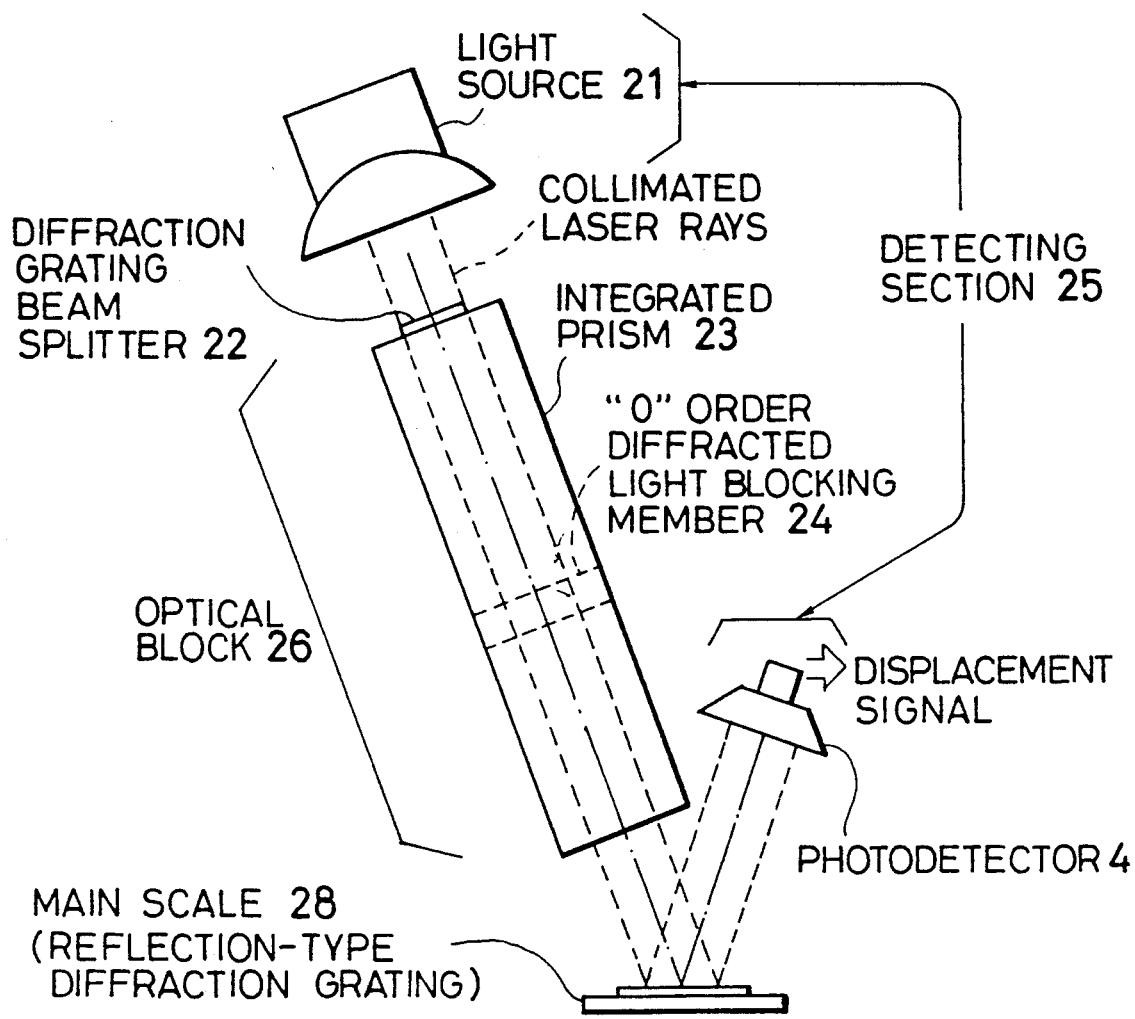

FIG. 5 illustrates still another example of an optical position-detecting apparatus according to the present invention, the drawing schematically showing the construction of the apparatus in correspondence with the construction shown in FIG. 2. Components which are the same as those in FIG. 2 are denoted by identical reference numerals, and a description of these components will be omitted. FIG. 5 is a view taken from one end of the longitudinal direction of a main scale 28. The optical position-detecting apparatus includes, in place of the main scale 2 (in FIG. 2) formed with the transmission-type diffraction grating, the main scale 28 formed with a reflection-type diffraction grating.

The apparatus has its photodetector 4 disposed at a position which is on the same side as the optical block 26 with respect to the main scale 28, and at which the photodetector 4 can receive light reflected from the main scale 28. With the above construction, when bright bands oppose reflecting portions of the reflection-type diffraction grating, the quantity of light made incident on the photodetector 4 is the maximum, whereas when dark bands oppose reflecting portions of the reflection-type diffraction grating, the quantity of light made incident on the photodetector 4 is the minimum. Accordingly, when the detecting section 25 and the optical block 26 have been displaced relative to the main scale 28 in the longitudinal direction of the main scale 28, the relationship with which bright and dark bands oppose transmitting and non-transmitting portions of the reflection-type grating changes periodically, resulting in that the quantity of light made incident on the photodetector 4 changes periodically so that a periodical displacement signal is obtained.

Figure 6:
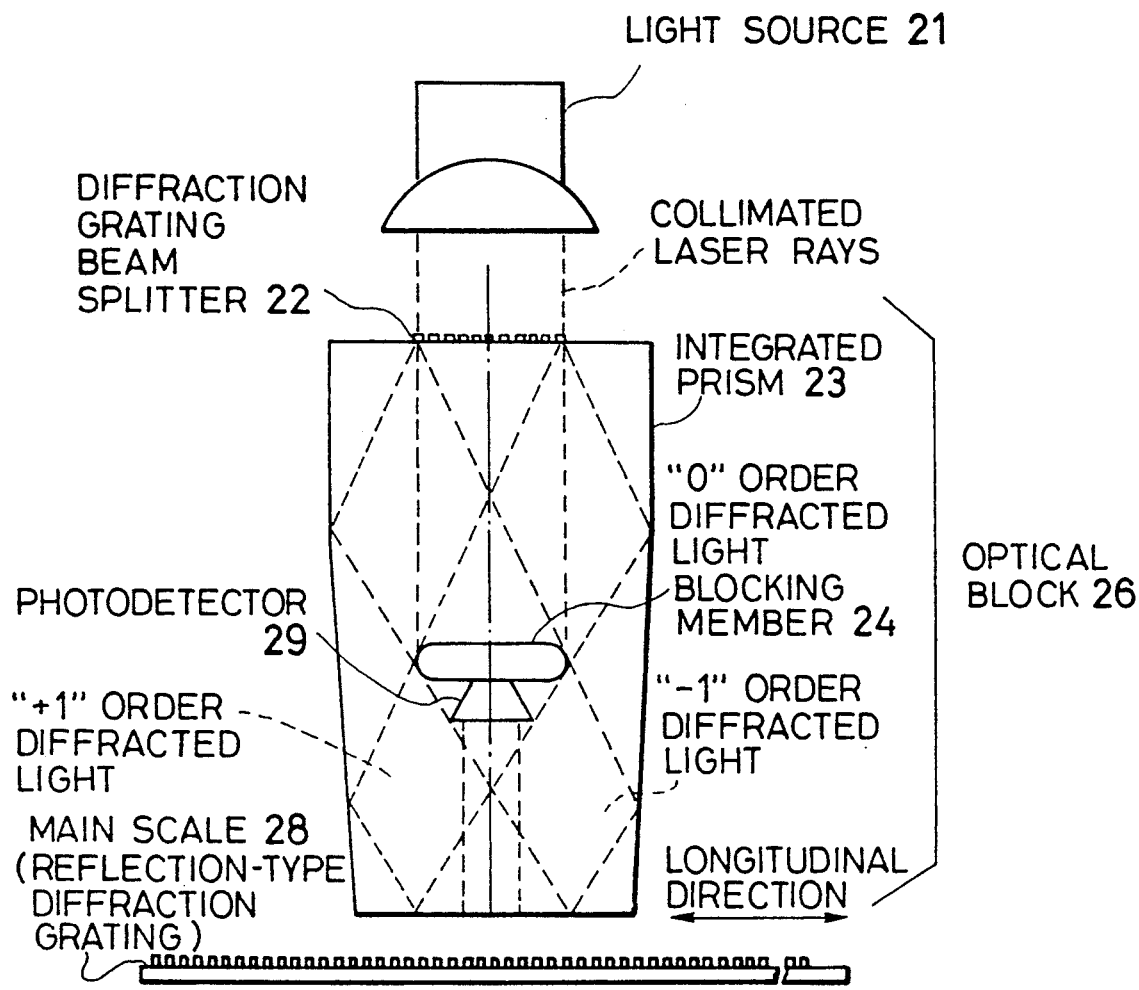

FIG. 6 illustrates a further example of an optical position-detecting apparatus according to the present invention, the drawing schematically showing the construction of the apparatus in correspondence with the construction shown in FIG. 2. Components which are the same as those in FIG. 2 are denoted by identical reference numerals, and the description of these components will be omitted. The optical position-detecting apparatus includes, in place of the main scale 2 (in FIG. 2) formed with the transmission-type diffraction grating, a main scale 28 formed with a reflection-type grating. The apparatus also includes a photodetector 29 disposed below (as viewed in the drawing) the "0" order diffracted light blocking member 24 in such a manner that light reflected from the reflection-type diffraction grating 28 is again made incident on the integral prism 23, then projected onto the photodetector 29, and subjected to the photo-electric conversion. This arrangement of the photodetector 29 enables the optical position-detecting apparatus to be small-sized.

As described above, according to the present invention, since an outputted displacement signal is always stable, it is possible to detect a position with high levels of precision and reliability.

It should be understood that many modifications and adaptations of the invention will become apparent to those skilled in the art and it is intended to encompass such obvious modifications and changes in the scope of the claims appended hereto.

What is claimed is:

1. An optical position-detecting apparatus adapted to detect the position of a subject of measurement by receiving either light transmitted through a diffraction grating on said subject of measurement or light reflected from said diffraction grating, said apparatus comprising a means for causing collimated rays generated from a coherent light source to be diffracted; an integrated prism for causing only the "±1" order diffracted light to be extracted and to interfere with each other, and for causing an interference light field area having interference fringes perpendicular to said diffraction grating to be generated and to be projected onto said diffraction grating.

2. An optical position-detecting apparatus according to claim 1, wherein a means for diffracting collimated rays generated from said coherent light source is a diffraction grating formed on the surface of said intergrated prism.

3. An optical position-detecting apparatus according to claim 1, wherein said diffraction grating on said subject of measurement is a transmission-type diffraction grating, and wherein a photo-detecting means for receiving light transmitted through said diffraction grating is displaceable together with said intergrated prism.

4. An optical position-detecting apparatus according to claim 1, wherein said diffraction grating on said subject of measurement is a transmission-type diffraction grating, and wherein a photo-detecting means for receiving light transmitted through said diffraction grating forms a structure integral with said diffraction grating.

5. An optical position detecting apparatus according to claim 4, wherein the light receiving surface of said photo-detecting means is patterned into a grating-like shape to provide said diffraction grating on said subject of measurement.

6. An optical position-detecting apparatus according to claim 1, wherein said diffraction grating on said subject of measurement is a reflection-type diffraction grating, and wherein a photo-detecting means for receiving light reflected from said diffraction grating is displaceable together with said intergrated prism.

7. An optical position-detecting apparatus according to claim 6, wherein said photo-detecting means is provided within said intergrated prism.

* * * * *